(12) United States Patent
Blasing

(10) Patent No.: US 6,310,338 B1
(45) Date of Patent: Oct. 30, 2001

(54) SOLAR ALTITUDE DETECTOR

(75) Inventor: Frank Blasing, Werl (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/529,171

(22) PCT Filed: Nov. 5, 1998

(86) PCT No.: PCT/EP98/07050

§ 371 Date: Apr. 7, 2000

§ 102(e) Date: Apr. 7, 2000

(87) PCT Pub. No.: WO99/24276

PCT Pub. Date: May 20, 1999

(30) Foreign Application Priority Data

Nov. 5, 1997 (DE) .............................. 197 48 826

(51) Int. Cl.⁷ .................................................. G01C 21/02
(52) U.S. Cl. ...................................... 250/206.1; 250/206.3
(58) Field of Search ............................... 250/206.1, 206.3

(56) References Cited

U.S. PATENT DOCUMENTS 4,857,721 * 8/1989 Dunavan et al. ................ 250/203
5,355,222 10/1994 Heller et al. .
5,455,415 10/1995 Yamada et al. .
5,483,060 * 1/1996 Sugiura et al. .................. 250/237

FOREIGN PATENT DOCUMENTS

| 403 095 | 3/1997 | (AT) . |
| 38 21 743 | 1/1990 | (DE) . |
| 40 41 770 | 7/1992 | (DE) . |
| 195 48 578 | 7/1997 | (DE) . |

* cited by examiner

*Primary Examiner*—Robert H. Kim
*Assistant Examiner*—Courtney Thomas
(74) *Attorney, Agent, or Firm*—Brooks & Kushman P.C.

(57) ABSTRACT

The invention relates to a solar altitude detector (1) for motor vehicles comprising a shade mask (2) in which a passage opening (5) provided for permitting sunlight though is inserted, said opening creating a light structure when irradiated. A sensor array (3) comprising a plurality of individual pixels is representively arranged under the shade mask (2) such that individual sections of the light structure created by the passage opening (5) fall on the photosensitive surface of the sensor array (3) during solar radiation. Various pixels of the sensor array (3) are irradiated according to the incidence angle of the sunlight passing through the passage opening (5) such that a clear statement which refers to the incidence angle and to the incidence direction of the sunlight is possible.

15 Claims, 2 Drawing Sheets

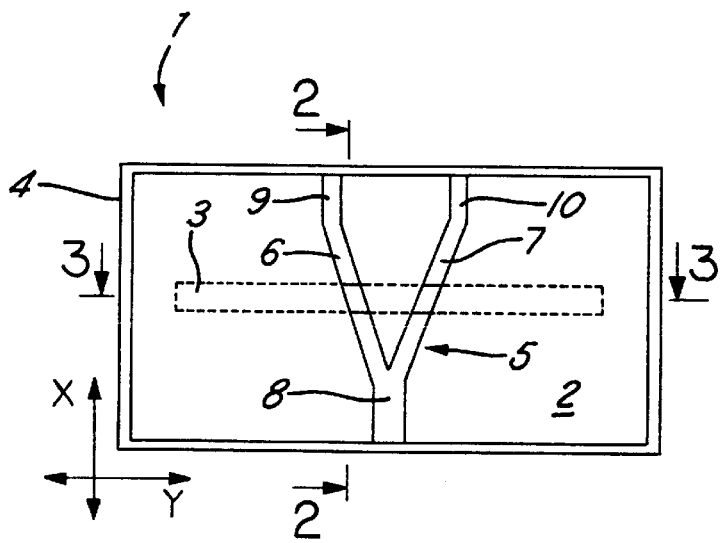
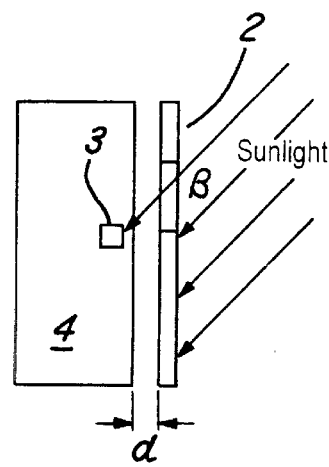
FIG.1  FIG.2
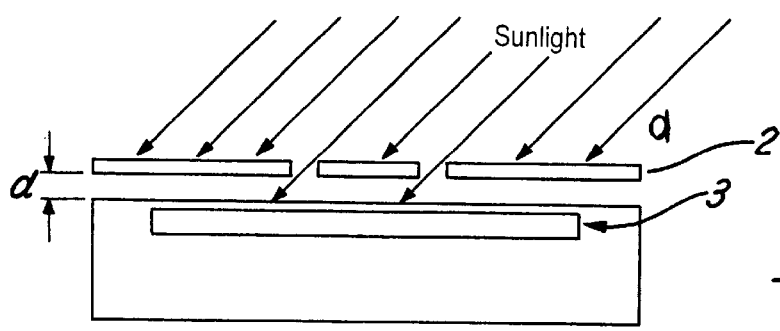
FIG.3

SOLAR ALTITUDE DETECTOR

TECHNICAL FIELD

The invention relates to a solar altitude detector for motor vehicles having a photosensitive sensor unit and having a shade mask which in dependence upon the solar altitude shades different regions of the sensor unit, which sensor unit is connected to a processor unit for the purpose of evaluating the direction of solar radiation and for controlling actuators.

BACKGROUND ART

Solar altitude detectors are used in motor vehicles for the purpose of controlling the temperature of the internal compartment of the vehicle. For example, DE 40 41 770 C1 discloses a solar sensor which in dependence upon the intensity of the solar radiation serves to control the air conditioning system in a motor vehicle. This type of solar sensor essentially consists of an optoelectronic transducer which has a lens connected upstream thereof for the purpose of detecting the broadest possible section of the environment. Although this type of device is able to detect the radiation intensity of incident sunlight, it is not possible to detect the solar altitude.

DE 38 21 743 A1 discloses a solar altitude detector, wherein two solar sensors of this type are provided as the sensor unit. The sensors are disposed with respect to each other in such a manner that it is possible to identify the direction of incidence of the light. For this purpose it is possible to dispose the two sensors in an angular manner with respect to each other or to separate them from each other by means of a shade mask or separating disc. The light intensities which are detected by the two sensors are different in dependence upon the incidence of light, so that this difference can be used to indicate the radiation direction. The two solar sensors are connected to a processor unit which evaluates the detected solar intensity and which can control the air conditioning system irrespective of the side of the vehicle.

This type of solar altitude detector is conventionally disposed on the upper side of the motor vehicle instrument panel behind the windscreen. The shade mask points in the direction of travel, so that a left-hand solar sensor and a right-hand solar sensor are formed. If sunlight impinges upon this solar altitude detector from the front or from above, this irradiates both the left-hand solar sensor and the right-hand solar sensor to the same extent. Consequently, the air conditioning installation which is allocated to each side of the vehicle is controlled in an identical manner. In contrast, if the sunlight impinges upon the solar altitude detector at a lateral angle, i.e. from the passenger side, then the right-hand solar sensor will detect the solar intensity. Conversely, the left-hand solar sensor is shaded by virtue of the disc-like shade mask. This different solar intensity detection in the two solar sensors directly indicates an approximate solar altitude, namely on the right-hand side, middle or left-hand side. It follows from this example that the air conditioning system on the passenger side exposed to sunlight is consequently controlled to provide a greater cooling effect than the air conditioning system on the driver side which is in the shade.

This known solar altitude detector renders it possible to detect the solar altitude on a right-hand side, middle, left-hand side basis. However, it is desirable to be able to detect the solar altitude with the aid of a solar altitude detector, wherein it is not only possible to detect the solar altitude with respect to the right-hand side, middle, left-hand side-arrangement, but it is also possible to detect the solar altitude within the half space located above a vehicle. This type of method of detecting the solar altitude is particularly desirable if further solar altitude-dependent functions, such as e.g. tinting control of electrochromic vehicle windows are required.

DE 195 48 578 A1 discloses a position-selective passive infra-red intrusion sensor. This sensor is used to detect moving and static heat being radiated by objects for the purpose of determining the position of said objects and for the purpose of determining the direction of movement of objects of this type. For the locating process, the sensor unit comprises a plurality of receivers which cover different angle ranges, wherein the angle ranges of adjacent receivers overlap in regions. The output signals of the receivers are then ascertained by virtue of a comparison of the intensities received in the different receivers, from which it is possible to determine the direction of incidence of the received heat radiation. However, this device is not suitable for use in detecting the solar altitude in relation to a motor vehicle.

A further solar altitude detector is known from AT 403 095 B. The subject matter of this document relates to a solar radiation measuring sensor for global and diffuse radiation. In the case of the solar altitude detector which is disclosed in this document a vertically disposed shade dispenser rod is provided, in whose base region a number of photosensitive receivers are disposed concentrically, surrounding said shade dispenser rod in an annular manner. In dependence upon the direction of incidence of the solar beams different receivers are shaded, from which it is possible to derive the direction of incidence of the solar beams. This device is also not suitable for detecting the angle of incidence—the azimuth. Furthermore, a disadvantage of this known solar altitude detector is that it is formed in a dome-shaped manner, which in turn prevents the solar altitude detector from being disposed on the motor vehicle body.

SUMMARY OF THE INVENTION

On the basis of this discussed prior art, it is therefore the object of the invention to provide a solar altitude detector which is not only suitable for use on the motor vehicle body but can also be used to detect both the direction of incidence and the angle of incidence of incident solar beams.

This object is achieved in accordance with the invention by virtue of the fact that the sensor unit is provided in the form of a sensor array which comprises a plurality of individual pixels and that a passage opening which produces a light structure is provided in the shade mask for the purpose of allowing the passage of sunlight, which light structure is arranged for the purpose of irradiating individual portions of the photosensitive surface of the sensor array and is formed in such a manner that the pixels of the sensor array which are irradiated in dependence upon the angle of incidence of the sunlight passing through the passage opening render it possible to provide a clear statement relating to the angle of incidence of the sunlight.

The solar altitude detector in accordance with the invention utilizes a shade mask which is provided with a passage opening, which produces a light structure, for the purpose of allowing the passage of sunlight. The shade mask is located in a horizontal arrangement and with respect to the sensor unit is disposed in such a manner that solar beams which pass through the passage opening irradiate the photosensitive surface of the sensor unit thus reproducing the light structure. In dependence upon the angle of incidence of the solar beams, the light structure is imaged accordingly at different regions on the photosensitive surface. In so doing, the position of the light structure on the surface of the sensor unit changes in dependence upon the solid angle, at which the solar beams impinge upon the shade mask.

Since the sensor unit is provided in the form of a sensor array which has a plurality of individual pixels, it is possible to detect and evaluate the respective position of the light structure which irradiates the surface of the sensor array. The invention makes use of the fact that in dependence upon the resolution capability of the sensor array different solar altitudes can result in different pixel clusters of the sensor array being irradiated. The configuration of the passage opening of the shade mask is formed in such a manner that for the light structure produced by the passage opening and for the imaging thereof on the photosensitive surface of the sensor array the respectively irradiated pixels render it possible to provide a clear statement relating to the angle of incidence of the sunlight.

By virtue of this type of solar altitude detector in accordance with the invention which is expediently disposed in the region of the roof for the purpose of completely detecting the half space located above a motor vehicle, it is possible to perform a process of detecting the solar altitude which makes it possible to provide a statement relating to the solid angle of the incident solar beams. This different detection procedure thus also permits the use of the solar altitude detector for controlling the tinting of electrochromic vehicle windows. For example, in dependence upon the azimuth of the angle of incidence it is possible for windows to be tinted only in their upper region or also completely as required. It is then possible to eliminate the use of sun visors. Furthermore, this solar altitude detector also enables a statement to be provided relating to the direction of incidence of the solar beams, so that it is possible where required to tint the side windows, windscreen or rear windscreen accordingly. However, the solar altitude detector in accordance with the invention can also be used to carry out different solar altitude-dependent functions, such as controlling the air conditioning system.

In a particularly favorable exemplified embodiment the sensor array is provided in the form of a sensor line which is disposed transversely to the longitudinal extension of two portions of the passage opening which converge towards each other. It is provided that the length of the sensor line is considerably longer than the distance between the two portions extending in a convergent manner with respect to each other. The portions of the passage opening which converge towards each other and produce corresponding light structures are used to allocate clearly the direction of incidence and the angle of incidence of the solar beams. As a result of the sensor line which is disposed transversely with respect to the convergent progression of the portions, the diminishing distance between the two portions is a measurement of the azimuth of the solar altitude in the event of a solar altitude-dependent projection of the distance on to the sensor side, and the position of these light structures on the sensor line which are defined and spaced by virtue of the azimuth of the solar altitude is a measurement of the direction of incidence.

The passage opening is preferably formed in a Y-shaped manner, so that the two portions which converge towards each other run together to form a common front passage. The common front passage can comprise parallel limits. This type of solar altitude detector is expediently installed with the front passage pointing to the front in the direction of travel. The sensor line which is disposed transversely to the longitudinal extension of the convergent portions is then mounted transversely to the direction of travel. The formation of a common front passage does not impair the resolution capability of the solar altitude detector because only if solar beams come directly from the front and at the same time have an extremely small angle of incidence does it cause this front passage to be imaged on the sensor line. When the altitude of the sun is such that the solar beams which impinge upon the solar altitude detector enter through the front passage, it is possible to differentiate between the right-hand side and the left-hand side over the entire width of the sensor line.

Accordingly, it is also possible for the ends of the convergent portions lying opposite the common front passage to be aligned in parallel with each other. The magnitude of the maximum distance between the converging portions also ultimately determines the length of the sensor line which is to be used. Since the sensor line should not be unnecessarily long and since, in the event of extremely low solar altitudes in which the sun light falls on to the motor vehicle from behind, it is also not absolutely necessary to differentiate completely between the left and right-hand side, it is possible to form the rearward end portions of the converging portions in a parallel manner.

In one exemplified embodiment, it is provided that the shade mask is disposed at a predetermined distance above the surface of the sensor array. The distance of the shade mask from the surface of the sensor array also serves to influence inter alia the resolution capability of the solar altitude detector. Likewise, the distance of the shade mask from the surface of the solar altitude detector serves to define the region of the half space which is to be detected. If the distance of the shade mask from the photosensitive surface of the sensor array is small then it is possible to observe a larger half space than is the case with a greater distance. However, the resolution capability of a solar altitude detection procedure is correspondingly diminished. Therefore, the distance between the shade mask and the sensor array is to be selected such that the half space which is to be observed is sufficiently large and the resolution capability is sufficient.

In a further exemplified embodiment it is provided that one end face of a light-guiding fiber bundle is disposed at the above defined distance from the shade mask and this fiber bundle is used to transport the light structure to the photosensitive surface of the sensor array. The sensor array can then be disposed, for example, in a central position in a motor vehicle. This type of design has the advantage that no electric or electronic components are required in the region of the roof. However, it is necessary to take into consideration that the resolution capability of this type of solar altitude detector is also determined by virtue of the diameter of the individual fibers of a fiber bundle of this type.

Further advantages of the invention and embodiments are included in the remaining subordinate claims and the description hereinunder of an exemplified embodiment.

BRIEF DESCRIPTION OF THE DRAWINGS

FIG. 1 shows a schematic plan view of a solar altitude detector utilizing a sensor line as the sensor array, FIG. 2 shows a cross-section of the solar altitude detector of FIG. 1 along the line 2—2, FIG. 3 shows a longitudinal sectional view of the solar altitude detector of FIG 1 along the line 3—3, FIGS. 4a, b show further shade masks for solar altitude detectors which utilize a sensor line.

BEST MODE FOR CARRYING OUT THE INVENTION

Figure 4A:
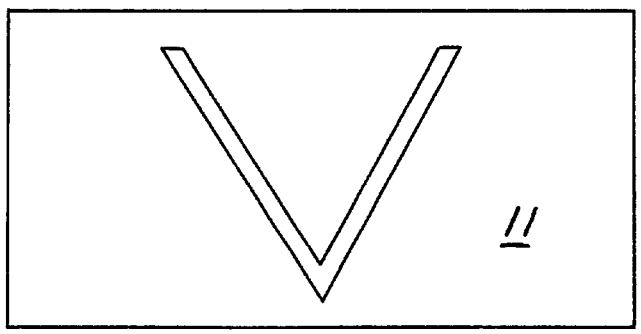

A solar altitude detector 1 comprises a shade mask 2 and a sensor line 3 disposed underneath. As illustrated in FIG. 2, the sensor line 3 is accommodated in a sensor housing 4. A passage opening 5 is provided in the shade mask 2 and produces a light structure when irradiated by sunlight. This light structure or portions of this light structure then irradiate different pixel clusters of the sensor line 3.

The passage opening 5 comprises two portions 6, 7 which converge towards each other and which issue with their converging ends into a front passage 8. The ends of the portions 6, 7 lying opposite the front passage 8 issue into rear portions 9, 10 which are disposed in parallel with each other.

In dependence upon the direction of incidence and the angle of incidence of the sunlight which impinges in parallel beams upon the surface of the shade mask 2, different pixel clusters of the sensor line 3 are irradiated by portions of the light structure formed by the passage opening 5, which portions reproduce according to the solar altitude.

The solar altitude detector 1 is disposed below a transparent pane in the roof of the motor vehicle, wherein the front passage 8 points to the front in the direction of vehicle travel and correspondingly the rear portions 9, 10 of the passage opening 5 are disposed pointing to the rear. The sensor line 3 is then disposed transversely to the direction of travel of the motor vehicle as indicated by the coordinate axis with x- and y- direction respectively. The distance between the two portions 6, 7 represents the solar altitude angle in the x-direction. The solar altitude is differentiated in this direction exclusively in the region of the converging portions 6, 7. In the region of the front passage 8 and in the region of the rear portions 9, 10, it is not possible to differentiate the solar altitude in this direction owing to the parallel arrangement of said rear portions with respect to the x-direction. This is also not required, since these portions are already irradiated by solar beams if the sun is extremely low and thus has a very small angle of incidence. The rear portions 9, 10 are consequently arranged in parallel, so that the length of the sensor line 3 does not have to be unnecessarily large in dimension.

Assuming that the solar radiation comes from the top right-hand side, a portion on the sensor array 3 is irradiated as indicated in FIGS. 2 and 3. With reference to these Figures it is evident that the distance between the shade mask 2 and the sensor line 3 influence both the resolution capability of the solar altitude detector 1 and also influence the azimuth of the solar altitude, of which only a minimum is to be detected.

The solar altitude can be calculated by detecting the two solid angles α and β. In so doing it is possible to observe both the absolute position of the entire projection on the sensor line 3 and the relative position of the two partial projections of the portions 6, 7 with respect to each other.

Figure 4B:
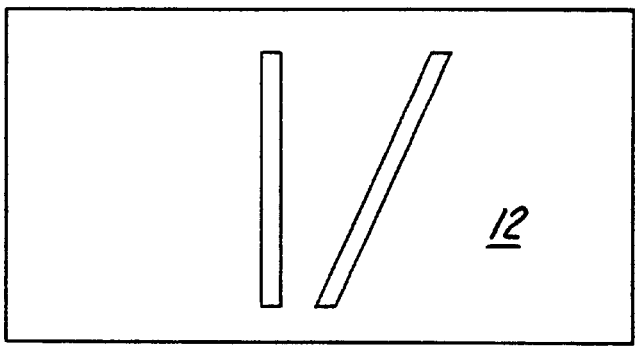

Instead of the shade mask 2 which is illustrated in FIGS. 1–3, it is also possible, for example, to use such shade masks 11, 12 as illustrated in FIGS. 4a and 4b.

Figure 5:
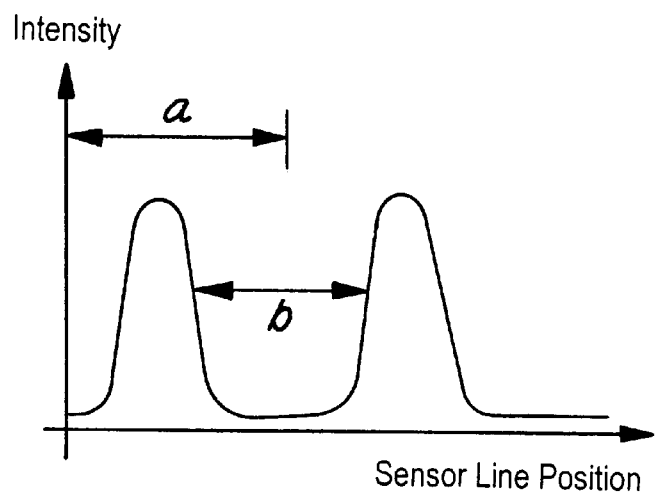
FIG. 5 shows a signal diagram of a sensor line when exposed to light by means of a light structure in accordance with the solar altitude detector of FIG. 1.

The signals of the selected sensor line 3 in the case of the given solar radiation are illustrated in FIG. 5. The pixel regions which are irradiated by the solar beams which pass through the portions 6, 7 are clearly evident. The flank distance b between the two signal peaks is then a measurement of the direction of the solar radiation in the x-direction, the middle distance a which is measured from the edge of the sensor line 3 is a measurement of the solar altitude direction in the y-direction. The real angles α, β shown in FIGS. 2 and 3 are not produced in a linear manner from a and b but according to the formulae set down hereinunder:

$$\alpha = \arctan\frac{d}{a}, \quad \beta = \arctan\frac{k \cdot b}{d},$$

wherein d corresponds to the distance between the shade mask 2 and the sensor line 3 and k corresponds to the pitch of the passage opening 5.

The data which is detected by the sensor line 3 can also be evaluated with respect to their flank steepness and other exposure parameters, in order to obtain further information with respect to the illumination situation. For example, the sensitivity of the sensor line can be designed in such a manner that it is overloaded in the case of direct solar radiation. Consequently, a steep signal flank can be obtained, compared with one produced by diffused incident light, whereby flatter signal flanks are formed. The detection of the entire light intensity also allows the solar altitude detector 1 to switch the vehicle illumination.

List of Reference Numerals 1 solar altitude detector
2 shade mask
3 sensor line
4 sensor housing
5 passage opening
6 portion of the passage opening
7 portion of the passage opening
8 front passage
9 rear portion
10 rear portion
11 shade mask
12 shade mask
a edge distance of the middle flank distance
b flank distance
d distance between the shade mask and the sensor line
pitch of the passage opening
α angle of incidence in the x-direction
β angle of incidence in the y-direction

What is claimed is:

1. A solar altitude detector for motor vehicles, the solar attitude detector comprising:
   a photo sensor line; and
   a shade mask horizontally disposed over the photo sensor line, the shade mask having a light passage opening for passing sunlight to the photo sensor line to radiate the photo sensor line with sunlight, the light passage opening having two portions which converge towards each other, wherein the photo sensor line is disposed transversely with respect to the two portions of the light passage opening such that the two portions of the light passage opening pass sunlight to radiate the photo sensor line as a function of the angle of incidence of the sunlight and the direction of incidence of the sunlight.

2. The solar altitude detector of claim 1 wherein:
   the photo sensor line and the shade mask are located in the roof of a motor vehicle.

3. The solar altitude detector of claim 1 wherein:
   the two portions of the light passage opening which converge towards each other are combined together at one end of the shade mask to form a common front passage directed toward the front of a motor vehicle.

4. The solar altitude detector of claim 3 wherein:

the two portions of the light passage opening which converge towards each other run parallel with respect to one another at the other end of the shade mask to form spaced apart parallel portions directed toward the back of the motor vehicle.

5. The solar altitude detector of claim 1 wherein:

the shade mask is horizontally disposed over the photo sensor line at a predetermined distance d.

6. The solar altitude detector of claim 5 wherein:

the photo sensor line is arranged transversely with respect to the direction of travel of a motor vehicle.

7. The solar altitude detector of claim 6 wherein:

the photo sensor line has a longitudinal array of pixels, wherein the photo sensor line generates a sunlight signal as a function of the intensity of the sunlight radiating each pixel versus the position of each pixel along the photo sensor line.

8. The solar altitude detector of claim 7 wherein:

the sunlight signal includes two sunlight intensity peaks along the photo sensor line when sunlight passes through the two portions of the light passage opening and radiates the photo sensor line.

9. The solar altitude detector of claim 8 wherein:

the direction of incidence of the sunlight transverse to the direction of travel of the motor vehicle is determinable from the sunlight signal as a function of a flank distance b separating the two sunlight intensity peaks of the sunlight signal.

10. The solar altitude detector of claim 8 wherein:

the direction of incidence of the sunlight along the direction of travel of the motor vehicle is determinable from the sunlight signal as a function of a middle distance a from one edge of the photo sensor line to the position of the photo sensor line centered between the two sunlight intensity peaks.

11. The solar altitude detector of claim 10 wherein:

the angle of incidence of the sunlight is determinable from the sunlight signal as a function of 1) the predetermined distance d between the shade mask and the photo sensor line and 2) the middle distance a.

12. The solar altitude detector of claim 11 wherein:

the angle of incidence $\alpha$ of the sunlight is determinable from the sunlight signal in accordance with the following equation:

$$\alpha = \arctan(\text{predetermined distance } d/\text{middle distance } a).$$

13. The solar altitude detector of claim 9 wherein:

the angle of incidence of the sunlight is determinable from the sunlight signal as a function of 1) the flank distance b and 2) the predetermined distance d between the shade mask and the photo sensor line.

14. The solar altitude detector of claim 9 wherein:

the two portions of the light passage opening are separated by a pitch distance k where the photo sensor line extends transversely with respect to the two portions, wherein the angle of incidence of the sunlight is determinable from the sunlight signal as a function of 1) the flank distance b, 2) the pitch distance k, and 3) the predetermined distance d between the shade mask and the photo sensor line.

15. The solar altitude detector of claim 14 wherein:

the angle of incidence $\beta$ of the sunlight is determinable from the sunlight signal in accordance with the following equation:

$$\beta = \arctan(\text{pitch distance } k * \text{flank distance } b/\text{predetermined distance } d).$$

* * * * *